US010083550B1

(12) United States Patent
Snyder et al.

(10) Patent No.: US 10,083,550 B1
(45) Date of Patent: Sep. 25, 2018

(54) AUTOMATIC CRASH DETECTION

(71) Applicant: Allstate Insurance Company, Northbrook, IL (US)

(72) Inventors: Jared S. Snyder, Chicago, IL (US); Dana Ferguson, Chicago, IL (US); Grady Irey, Des Plaines, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 15/880,187

(22) Filed: Jan. 25, 2018

Related U.S. Application Data

(63) Continuation of application No. 15/665,710, filed on Aug. 1, 2017, now Pat. No. 9,916,698, which is a continuation of application No. 14/685,067, filed on Apr. 13, 2015, now Pat. No. 9,767,625.

(51) Int. Cl.
*G06F 19/00* (2018.01)
*G07C 5/00* (2006.01)
*G07C 5/08* (2006.01)

(52) U.S. Cl.
CPC .............. *G07C 5/008* (2013.01); *G07C 5/085* (2013.01)

(58) Field of Classification Search
CPC ... G07C 1/00; G07C 3/00; G07C 3/04; G07C 5/08; G07C 5/085; G07C 5/10; G07C 2209/08; G07C 2209/61
USPC .... 701/31.5, 121, 30.5, 30.9, 31.1, 301, 302
See application file for complete search history.

(56) References Cited

U.S. PATENT DOCUMENTS

| | | | |
|---|---|---|---|
| 2,833,495 A | 5/1958 | Feeney et al. | |
| 4,198,864 A | 4/1980 | Breed | |
| 4,716,458 A | 12/1987 | Heitzman et al. | |
| 5,517,183 A | 5/1996 | Bozeman, Jr. | |
| 5,719,554 A | 2/1998 | Gagnon | |
| 5,736,970 A | 4/1998 | Bozeman, Jr. | |
| 5,950,169 A | 9/1999 | Borghesi et al. | |

(Continued)

FOREIGN PATENT DOCUMENTS

| | | |
|---|---|---|
| AU | 2002301438 B2 | 9/2006 |
| AU | 2007200869 A1 | 3/2007 |

(Continued)

OTHER PUBLICATIONS

Nov. 30, 2017—(WO) International Search Report—PCT/US17/52199.

(Continued)

*Primary Examiner* — Muhammad Shafi
(74) *Attorney, Agent, or Firm* — Banner & Witcoff, Ltd.

(57) ABSTRACT

Systems and methods are disclosed for determining whether or not a crash involving a vehicle has occurred. The acceleration of the vehicle may be measured using, for example, an accelerometer of a mobile device, which may be located inside the vehicle. The system may determine the magnitude of each accelerometer measurement and whether the magnitude exceeds one or more acceleration magnitude thresholds. The system may also determine the number of accelerometer events within a time window and whether the number exceeds one or more count thresholds. The system may determine whether a crash involving the vehicle has occurred based on the magnitudes of acceleration, number of acceleration events, and various thresholds. In some examples, the system may confirm that a crash has occurred based on, for example, the location of the mobile device.

20 Claims, 4 Drawing Sheets

(56) References Cited

U.S. PATENT DOCUMENTS

| | | |
|---|---|---|
| 5,963,128 A | 10/1999 | McClelland |
| 6,023,664 A | 2/2000 | Bennet |
| 6,060,989 A | 5/2000 | Gehlot |
| 6,061,610 A | 5/2000 | Boer |
| 6,076,028 A | 6/2000 | Donnelly et al. |
| 6,141,611 A | 10/2000 | Mackey et al. |
| 6,246,933 B1 | 6/2001 | Bague |
| 6,262,657 B1 | 7/2001 | Okuda et al. |
| 6,266,617 B1 | 7/2001 | Evans |
| 6,295,492 B1 | 9/2001 | Lang et al. |
| 6,330,499 B1 | 12/2001 | Chou et al. |
| 6,405,112 B1 | 6/2002 | Rayner |
| 6,438,475 B1 | 8/2002 | Gioutsos et al. |
| 6,472,982 B2 | 10/2002 | Eida et al. |
| 6,509,868 B2 | 1/2003 | Flick |
| 6,539,249 B1 | 3/2003 | Kadhiresan et al. |
| 6,553,308 B1 | 4/2003 | Uhlmann et al. |
| 6,573,831 B2 | 6/2003 | Ikeda et al. |
| 6,594,579 B1 | 7/2003 | Lowrey et al. |
| 6,611,740 B2 | 8/2003 | Lowrey et al. |
| 6,641,038 B2 | 11/2003 | Gehlot et al. |
| 6,642,844 B2 | 11/2003 | Montague |
| 6,701,234 B1 | 3/2004 | Vogelsang |
| 6,732,020 B2 | 5/2004 | Yamagishi |
| 6,732,031 B1 | 5/2004 | Lightner et al. |
| 6,741,168 B2 | 5/2004 | Webb et al. |
| 6,756,887 B2 | 6/2004 | Evans |
| 6,765,499 B2 | 7/2004 | Flick |
| 6,798,356 B2 | 9/2004 | Flick |
| 6,909,947 B2 | 6/2005 | Douros et al. |
| 6,925,425 B2 | 8/2005 | Remboski et al. |
| 6,946,966 B2 | 9/2005 | Koenig |
| 6,982,654 B2 | 1/2006 | Rau et al. |
| 6,988,033 B1 | 1/2006 | Lowrey et al. |
| 7,069,118 B2 | 6/2006 | Coletrane et al. |
| 7,082,359 B2 | 7/2006 | Breed |
| 7,092,803 B2 | 8/2006 | Kapolka et al. |
| 7,099,835 B2 | 8/2006 | Williams, III |
| 7,113,127 B1 | 9/2006 | Banet et al. |
| 7,119,669 B2 | 10/2006 | Lundsgaard et al. |
| 7,129,826 B2 | 10/2006 | Nitz et al. |
| 7,133,611 B2 | 11/2006 | Kaneko |
| 7,135,993 B2 | 11/2006 | Okamoto et al. |
| 7,155,259 B2 | 12/2006 | Bauchot et al. |
| 7,155,321 B2 | 12/2006 | Bromley et al. |
| 7,158,016 B2 | 1/2007 | Cuddihy et al. |
| 7,174,243 B1 | 2/2007 | Lightner et al. |
| 7,271,716 B2 | 9/2007 | Nou |
| 7,305,293 B2 | 12/2007 | Flick |
| 7,323,972 B2 | 1/2008 | Nobusawa |
| 7,323,973 B1 | 1/2008 | Ceglia et al. |
| 7,348,895 B2 | 3/2008 | Lagassey |
| 7,418,400 B1 | 8/2008 | Lorenz |
| 7,477,968 B1 | 1/2009 | Lowrey et al. |
| 7,508,298 B2 | 3/2009 | Pisz et al. |
| 7,565,230 B2 | 7/2009 | Gardner et al. |
| 7,600,426 B2 | 10/2009 | Savolainen et al. |
| 7,624,031 B2 | 11/2009 | Simpson et al. |
| 7,650,235 B2 | 1/2010 | Lee et al. |
| 7,671,727 B2 | 3/2010 | Flick |
| 7,715,961 B1 | 5/2010 | Kargupta |
| 7,747,365 B1 | 6/2010 | Lowrey et al. |
| 7,872,636 B1 | 1/2011 | Gopi et al. |
| 7,908,921 B2 | 3/2011 | Binda et al. |
| 8,000,979 B2 | 8/2011 | Blom |
| 8,014,789 B2 | 9/2011 | Breed |
| 8,019,629 B1 | 9/2011 | Medina, III et al. |
| 8,022,845 B2 | 9/2011 | Zlojutro |
| 8,041,635 B1 | 10/2011 | Garcia et al. |
| 8,069,060 B2 | 11/2011 | Tipirneni |
| 8,090,598 B2 | 1/2012 | Bauer et al. |
| 8,140,358 B1 | 3/2012 | Ling et al. |
| 8,214,100 B2 | 7/2012 | Lowrey et al. |
| 8,229,759 B2 | 7/2012 | Zhu et al. |
| 8,255,275 B2 | 8/2012 | Collopy et al. |
| 8,260,639 B1 | 9/2012 | Medina, III et al. |
| 8,271,187 B2 | 9/2012 | Taylor et al. |
| 8,285,588 B2 | 10/2012 | Postrel |
| 8,311,858 B2 | 11/2012 | Everett et al. |
| 8,321,086 B2 | 11/2012 | Park et al. |
| 8,330,593 B2 | 12/2012 | Golenski |
| 8,370,254 B1 | 2/2013 | Hopkins, III et al. |
| 8,401,877 B2 | 3/2013 | Salvagio |
| 8,403,225 B2 | 3/2013 | Sharra et al. |
| 8,417,604 B2 | 4/2013 | Orr et al. |
| 8,423,239 B2 | 4/2013 | Blumer et al. |
| 8,432,262 B2 | 4/2013 | Talty et al. |
| 8,433,590 B2 | 4/2013 | Prescott |
| 8,438,049 B2 | 5/2013 | Ranicar, III et al. |
| 8,442,508 B2 | 5/2013 | Harter et al. |
| 8,442,797 B2 | 5/2013 | Kim et al. |
| 8,447,459 B2 | 5/2013 | Lowrey et al. |
| 8,452,486 B2 | 5/2013 | Banet et al. |
| 8,463,488 B1 | 6/2013 | Hart |
| 8,466,781 B2 | 6/2013 | Miller et al. |
| 8,478,514 B2 | 7/2013 | Kargupta |
| 8,484,113 B2 | 7/2013 | Collopy et al. |
| 8,494,938 B1 | 7/2013 | Kazenas |
| 8,510,133 B2 | 8/2013 | Peak et al. |
| 8,510,200 B2 | 8/2013 | Pearlman et al. |
| 8,527,135 B2 | 9/2013 | Lowrey et al. |
| 8,571,895 B1 | 10/2013 | Medina et al. |
| 8,577,703 B2 | 11/2013 | McClellan et al. |
| 8,581,712 B2 | 11/2013 | Morgan et al. |
| 8,589,015 B2 | 11/2013 | Willis et al. |
| 8,595,034 B2 | 11/2013 | Bauer et al. |
| 8,598,977 B2 | 12/2013 | Maalouf et al. |
| 8,620,692 B2 | 12/2013 | Collopy et al. |
| 8,630,768 B2 | 1/2014 | McClellan et al. |
| 8,633,985 B2 | 1/2014 | Haynes et al. |
| 8,635,091 B2 | 1/2014 | Amigo et al. |
| 8,688,380 B2 | 4/2014 | Cawse et al. |
| 8,712,893 B1 | 4/2014 | Brandmaier et al. |
| 8,751,270 B1 | 6/2014 | Hanson et al. |
| 8,799,034 B1 | 8/2014 | Brandmaier et al. |
| 8,930,581 B2 | 1/2015 | Anton et al. |
| 9,002,719 B2 | 4/2015 | Tofte |
| 9,324,201 B2 * | 4/2016 | Jun .................. G07C 5/0866 |
| 9,361,735 B1 | 6/2016 | Leise |
| 9,767,625 B1 * | 9/2017 | Snyder .................. G07C 5/008 |
| 2002/0003571 A1 | 1/2002 | Schofield et al. |
| 2002/0049535 A1 | 4/2002 | Rigo et al. |
| 2002/0055861 A1 | 5/2002 | King et al. |
| 2002/0111725 A1 | 8/2002 | Burge |
| 2003/0005765 A1 | 1/2003 | Brudis et al. |
| 2003/0233261 A1 | 12/2003 | Kawahara et al. |
| 2004/0000992 A1 | 1/2004 | Cuddihy et al. |
| 2004/0068350 A1 | 4/2004 | Tomson |
| 2004/0083123 A1 | 4/2004 | Kim et al. |
| 2004/0088090 A1 | 5/2004 | Wee |
| 2004/0128065 A1 | 7/2004 | Taylor et al. |
| 2004/0145457 A1 | 7/2004 | Schofield et al. |
| 2004/0186744 A1 | 9/2004 | Lux |
| 2004/0189493 A1 | 9/2004 | Estus et al. |
| 2004/0189722 A1 | 9/2004 | Acres |
| 2004/0205622 A1 | 10/2004 | Jones et al. |
| 2005/0021374 A1 | 1/2005 | Allahyari |
| 2005/0104745 A1 | 5/2005 | Bachelder et al. |
| 2005/0119826 A1 | 6/2005 | Lee et al. |
| 2005/0161505 A1 | 7/2005 | Yin et al. |
| 2005/0216487 A1 | 9/2005 | Fisher et al. |
| 2005/0278082 A1 | 12/2005 | Weekes |
| 2006/0025897 A1 | 2/2006 | Shostak et al. |
| 2006/0055583 A1 | 3/2006 | Orr et al. |
| 2006/0067573 A1 | 3/2006 | Parr et al. |
| 2006/0192783 A1 | 8/2006 | Kass et al. |
| 2006/0224305 A1 | 10/2006 | Ansari et al. |
| 2006/0226960 A1 | 10/2006 | Pisz et al. |
| 2006/0282202 A1 | 12/2006 | Cashler et al. |
| 2007/0009136 A1 | 1/2007 | Pawlenko et al. |
| 2007/0027583 A1 | 2/2007 | Tamir et al. |
| 2007/0037610 A1 | 2/2007 | Logan |
| 2007/0043594 A1 | 2/2007 | Lavergne |
| 2007/0136162 A1 | 6/2007 | Thibodeau et al. |

(56) References Cited

U.S. PATENT DOCUMENTS

| | | |
|---|---|---|
| 2007/0162308 A1 | 7/2007 | Peters |
| 2007/0288268 A1 | 12/2007 | Weeks |
| 2008/0027761 A1 | 1/2008 | Bracha |
| 2008/0052134 A1 | 2/2008 | Nowak et al. |
| 2008/0078253 A1 | 4/2008 | Blackwood et al. |
| 2008/0215375 A1 | 9/2008 | Nakano et al. |
| 2008/0242261 A1 | 10/2008 | Shimanuki et al. |
| 2008/0255722 A1 | 10/2008 | McClellan et al. |
| 2008/0294690 A1 | 11/2008 | McClellan et al. |
| 2008/0300731 A1 | 12/2008 | Nakajima et al. |
| 2008/0306636 A1 | 12/2008 | Caspe-Detzer et al. |
| 2008/0306996 A1 | 12/2008 | McClellan et al. |
| 2008/0319665 A1 | 12/2008 | Berkobin et al. |
| 2009/0013755 A1 | 1/2009 | Tsai et al. |
| 2009/0036091 A1 | 2/2009 | Ball et al. |
| 2009/0063174 A1 | 3/2009 | Fricke |
| 2009/0099732 A1 | 4/2009 | Pisz |
| 2009/0106052 A1 | 4/2009 | Moldovan |
| 2009/0125180 A1 | 5/2009 | Berkobin et al. |
| 2009/0164504 A1 | 6/2009 | Flake et al. |
| 2009/0192688 A1 | 7/2009 | Padmanabhan et al. |
| 2009/0198772 A1 | 8/2009 | Kim et al. |
| 2009/0234678 A1 | 9/2009 | Arenas |
| 2009/0248283 A1 | 10/2009 | Bicego, Jr. |
| 2009/0254241 A1 | 10/2009 | Basir |
| 2009/0265385 A1 | 10/2009 | Beland et al. |
| 2010/0020170 A1 | 1/2010 | Higgins-Luthman et al. |
| 2010/0030540 A1 | 2/2010 | Choi et al. |
| 2010/0036595 A1 * | 2/2010 | Coy ............... G08G 1/0104 701/119 |
| 2010/0049552 A1 | 2/2010 | Fini et al. |
| 2010/0131300 A1 | 5/2010 | Collopy et al. |
| 2010/0138242 A1 | 6/2010 | Ferrick et al. |
| 2010/0161491 A1 | 6/2010 | Bauchot et al. |
| 2010/0174564 A1 | 7/2010 | Stender et al. |
| 2010/0205012 A1 | 8/2010 | McClellan |
| 2010/0219944 A1 | 9/2010 | Mc Cormick et al. |
| 2010/0250369 A1 | 9/2010 | Peterson et al. |
| 2010/0323657 A1 | 12/2010 | Barnard et al. |
| 2011/0012720 A1 | 1/2011 | Hirschfeld |
| 2011/0060496 A1 | 3/2011 | Nielsen et al. |
| 2011/0070834 A1 | 3/2011 | Griffin et al. |
| 2011/0070864 A1 | 3/2011 | Karam et al. |
| 2011/0077028 A1 | 3/2011 | Wilkes, III et al. |
| 2011/0106449 A1 | 5/2011 | Chowdhary et al. |
| 2011/0118934 A1 | 5/2011 | Lowrey et al. |
| 2011/0153367 A1 | 6/2011 | Amigo et al. |
| 2011/0153369 A1 | 6/2011 | Feldman et al. |
| 2011/0161116 A1 | 6/2011 | Peak et al. |
| 2011/0161118 A1 | 6/2011 | Borden et al. |
| 2011/0161119 A1 | 6/2011 | Collins |
| 2011/0185178 A1 | 7/2011 | Gotthardt |
| 2011/0281564 A1 | 11/2011 | Armitage et al. |
| 2011/0307119 A1 | 12/2011 | Basir et al. |
| 2011/0307188 A1 | 12/2011 | Peng et al. |
| 2012/0028680 A1 | 2/2012 | Breed |
| 2012/0047203 A1 | 2/2012 | Brown et al. |
| 2012/0072243 A1 | 3/2012 | Collins et al. |
| 2012/0076437 A1 | 3/2012 | King |
| 2012/0084179 A1 | 4/2012 | McRae et al. |
| 2012/0109690 A1 | 5/2012 | Weinrauch et al. |
| 2012/0109692 A1 | 5/2012 | Collins et al. |
| 2012/0119936 A1 | 5/2012 | Miller et al. |
| 2012/0136802 A1 | 5/2012 | McQuade et al. |
| 2012/0150412 A1 | 6/2012 | Yoon et al. |
| 2012/0191476 A1 | 7/2012 | Reid et al. |
| 2012/0197486 A1 | 8/2012 | Elliott |
| 2012/0197669 A1 | 8/2012 | Kote et al. |
| 2012/0202551 A1 | 8/2012 | Mirbaha et al. |
| 2012/0209631 A1 | 8/2012 | Roscoe et al. |
| 2012/0209632 A1 | 8/2012 | Kaminski et al. |
| 2012/0230548 A1 | 9/2012 | Calman et al. |
| 2012/0232995 A1 | 9/2012 | Castro et al. |
| 2012/0239417 A1 | 9/2012 | Pourfallah et al. |
| 2012/0242503 A1 | 9/2012 | Thomas et al. |
| 2012/0250938 A1 | 10/2012 | DeHart |
| 2012/0259665 A1 | 10/2012 | Pandhi et al. |
| 2012/0290150 A1 | 11/2012 | Doughty et al. |
| 2012/0303392 A1 | 11/2012 | Depura et al. |
| 2012/0316893 A1 | 12/2012 | Egawa |
| 2012/0330687 A1 | 12/2012 | Hilario et al. |
| 2013/0006674 A1 | 1/2013 | Bowne et al. |
| 2013/0006675 A1 | 1/2013 | Bowne et al. |
| 2013/0018676 A1 | 1/2013 | Fischer et al. |
| 2013/0033386 A1 | 2/2013 | Zlojutro |
| 2013/0035964 A1 | 2/2013 | Roscoe et al. |
| 2013/0046510 A1 | 2/2013 | Bowne et al. |
| 2013/0054274 A1 | 2/2013 | Katyal |
| 2013/0069802 A1 | 3/2013 | Foghel et al. |
| 2013/0073318 A1 | 3/2013 | Feldman et al. |
| 2013/0073321 A1 | 3/2013 | Hofmann |
| 2013/0090881 A1 | 4/2013 | Janardhanan et al. |
| 2013/0138267 A1 | 5/2013 | Hignite et al. |
| 2013/0151288 A1 | 6/2013 | Bowne et al. |
| 2013/0166098 A1 | 6/2013 | Lavie et al. |
| 2013/0166326 A1 | 6/2013 | Lavie et al. |
| 2013/0179027 A1 | 7/2013 | Mitchell |
| 2013/0179198 A1 | 7/2013 | Bowne et al. |
| 2013/0190967 A1 | 7/2013 | Hassib et al. |
| 2013/0197856 A1 * | 8/2013 | Barfield ............. G01P 15/00 702/141 |
| 2013/0197945 A1 | 8/2013 | Anderson |
| 2013/0204645 A1 | 8/2013 | Lehman et al. |
| 2013/0211660 A1 | 8/2013 | Mitchell |
| 2013/0226369 A1 | 8/2013 | Yorio et al. |
| 2013/0226397 A1 | 8/2013 | Kuphal et al. |
| 2013/0289819 A1 | 10/2013 | Hassib et al. |
| 2013/0290036 A1 | 10/2013 | Strange |
| 2013/0297097 A1 | 11/2013 | Fischer et al. |
| 2013/0297353 A1 | 11/2013 | Strange et al. |
| 2013/0297418 A1 | 11/2013 | Collopy et al. |
| 2013/0300552 A1 | 11/2013 | Chang |
| 2013/0311209 A1 | 11/2013 | Kaminski et al. |
| 2013/0316310 A1 | 11/2013 | Musicant et al. |
| 2013/0317860 A1 | 11/2013 | Schumann, Jr. |
| 2013/0317865 A1 | 11/2013 | Tofte et al. |
| 2013/0332026 A1 | 12/2013 | McKown et al. |
| 2013/0339062 A1 | 12/2013 | Brewer et al. |
| 2014/0067429 A1 | 3/2014 | Lowell |
| 2014/0081675 A1 | 3/2014 | Ives et al. |
| 2014/0121878 A1 | 5/2014 | Pandhi et al. |
| 2014/0122012 A1 | 5/2014 | Barfield |
| 2014/0132404 A1 | 5/2014 | Katoh et al. |
| 2014/0244312 A1 | 8/2014 | Gray et al. |
| 2014/0244678 A1 | 8/2014 | Zamer et al. |
| 2014/0300739 A1 | 10/2014 | Mimar |
| 2014/0316825 A1 | 10/2014 | van Dijk et al. |
| 2014/0344050 A1 | 11/2014 | McKinley et al. |
| 2015/0006023 A1 | 1/2015 | Fuchs |
| 2015/0019267 A1 | 1/2015 | Prieto et al. |
| 2015/0073834 A1 | 3/2015 | Gurenko et al. |
| 2015/0106133 A1 | 4/2015 | Smith, Jr. |
| 2015/0149218 A1 | 5/2015 | Bayley et al. |
| 2015/0269791 A1 | 9/2015 | Amigo et al. |
| 2015/0324924 A1 | 11/2015 | Wilson et al. |

FOREIGN PATENT DOCUMENTS

| | | |
|---|---|---|
| CA | 2658219 A1 | 1/2008 |
| CN | 203025907 U | 6/2013 |
| CN | 103390326 A | 11/2013 |
| EP | 1488198 A2 | 12/2004 |
| EP | 1826734 A1 | 8/2007 |
| EP | 1965361 A2 | 9/2008 |
| EP | 2147320 A1 | 1/2010 |
| EP | 2481037 A1 | 8/2012 |
| GB | 2486384 A | 6/2012 |
| GB | 2488956 A | 9/2012 |
| KR | 2005112932 | 5/2004 |
| KR | 2005112932 * | 12/2005 |
| WO | 1998047109 A1 | 10/1998 |
| WO | 2002079934 A2 | 10/2002 |
| WO | 2012045128 A1 | 4/2012 |
| WO | 2012067640 A1 | 5/2012 |

(56) References Cited

FOREIGN PATENT DOCUMENTS

| WO | 2012097441 A1 | 7/2012 |
|----|---------------|--------|
| WO | 2012106878 A1 | 8/2012 |
| WO | 2012173655 A1 | 12/2012 |
| WO | 2012174590 A1 | 12/2012 |

OTHER PUBLICATIONS

Vehicle productivity, security & safety, 2010, Acadian Companies [On-line], Retrieved from the Internet: http://www.acadian.com/site598.php.
Bubble Level, 2010, Apple Inc. [On-line], Retrieved from the Internet: http://developer.apple.com/library/ios/samplecode/BubbleLevel/Listings/ReadMe_txt.html.
"Information-Sharing in Out-of-Hospital Disaster Response: The Future Role of Information Technology." Jeffrey L. Arnold et al., Abstracts of Prehospital and Disaster Medicine. Retrieved from http://journals.cambridge.org/action/displayAbstract?fromPage=online&aid=8231246 on May 20, 2013.
"Automated Collision Notification (ACN) Field Operational Test (FOT) Evaluation Report." L.R. Bachman et al., NHTSA. Feb. 2001.
Vehicle Performance Computer Owner's Manual, 2011. Beltronics [On-line], Retrieved from the Internet: http://www.beltronics.com.
"Scan Someone's License Plate and Message Them Instantly with New Bump App." Rebecca Boyle, Popular Science, Sep. 17, 2010. Retrieved from http://www.popsci.com/cars/article/2010-09/social-networking-site-uses-license-plates-connect-drivers on Jun. 28, 2013.
DynoStorm, 2009, BunsenTech, LLC [On-line], Retrieved from the Internet: http://www.bunsentech.com/projects/dynostorm/.
"License plate readers allow police to quickly scan, check for offenders." Ann Marie Bush, The Capital-Journal, Mar. 17, 2013, Retrieved from http://cjonline.com/news/2013-03-17/license-plate-readers-allow-police-quickly-scan-check-offenders on Jun. 28, 2013.
Solution: Fleet Performance, 2009, Cadec Global Inc. [On-line], Retrieved from the Internet: http://www.cadec.com/solutions/executiveDashboards.php.
"Trends 2013-North American Insurance eBusiness and Channel Strategy." Ellen Carney, Forrester. May 16, 2013.
"SmoothDrive app", CelluDrive Ltd., May 11, 2011, <http://www.celludrive.com/ptasite/home.htm>.
"Automatic Crash Notification." ComCARE Alliance. Retrieved from <http://www.nhtsa.gov/DOT/NHTSA/NRD/Articles/ERD/PDF/Research/COMCARE_ACN_System.pdf> on Nov. 12, 2013.
"Course Notebook." Jeremy S. Daily, ME 4024: Machine Dynamics, University of Tulsa; Spring 2013.
Rev User Manual, Nov. 9, 2009, DevToaster, LLC [On-line], Retrieved from the Internet: http://www.devtoaster.com.
"The Automated Collision Notification System." Bruce R. Donnelly et al., NHTSA. Retrieved from <http://nhtsa.gov/DOT/NHTSA/NRD/Articles/EDR/PDF/Research/Automated_Collision_Notification_System_PDF> on Nov. 12, 2013.
DragTimes.com Density Altitude, DragTimes, Sep. 1, 2013 <https://play.google.com/store/apps/details?id=com.DragTimes&feature=search_result>.
"The driving quality app: Product Description." DriSMo, retrieved from <http://hovedprosjekter.hig.no/v2011/imt/in/drismo/index.php?option=com_content&view=article&id=5&Itemid=3> on Apr. 15, 2015.
"Fraunhofer offers secure NFC keys that can be shared via QR codes." Karl Dryer, NFC World. Mar. 20, 2013. Retrieved from http://www.nftworld.com/2013/03/20/323184/fraunhofer-offers-secure-nfc-keys-that-can-be-shared-via-qr-codes on Nov. 13, 2013.
Carl Duzen, et al., Using an Accelerometer to Classify Motion, CAPE inc, 2001.
Everywhere Navigation: Integrated Solutions on Consumer Mobile Devices, Naser El-Sheimy et al., Inside GNSS, pp. 74-82, Oct. 2011.
"This App Turns Smartphones Into Safe Driving Tools." Kate Freeman, Mashable. Aug. 30, 2012. Retrieved from <http://mashable.com/2012/08/30/drivescribe-app-safe-driving> on Nov. 12, 2013.
"Automated Collision Notification (ACN) Field Operational Test-Final Report (FOT)." D. Funke et al., NHTSA. Oct. 31, 2000.
"Geico App-Android Apps on Google Play." GEICO. Retrieved from <http://play.google.com/store/apps/details?id=com.geico.mobile&hl=en> Nov. 12, 2013.
Your Resource Highway to driver Safety, 2011, GeoPoint Partners, LLC [On-line], Retrieved from the Internet: http://www.geopointpartners.com/.
"Automatic License Plate Recognition (ALPR) Scanning Systems." Experienced Criminal Lawyers, Get Lawyer Leads, Inc., Retrieved from http://www.experiencedcriminallawyers.com/articles/automatic-license-plate-recognition-alpr-scanning-systems on Jun. 28, 2013.
Giuseppe Ghiani, et al., Multimodal PDA Interfaces to Assist Drivers in Monitoring Their Vehicles, ISTI-CNR.
"Safe Driving and Accidental Monitoring Using GPS System and Three Axis Accelerometer." R. Goregaonkar et al., International Journal of Emerging Technology and Advanced Engineering, vol. 3(11), Nov. 2013.
"New Technology Security Risks : QR codes and Near Field Communication." Charlotte Gray. Retrieved from http://www.qwiktag.com/index.php/knowledge-base/150-technology-security-risks-qr-codes on Nov. 13, 2013.
"g-tac." Liberty for One, retrieved from <http://apps.libertyforone.com/g-tach/> on Jun. 17, 2015.
Technical Plan, Harker Innovation Team [On-line], Retrieved from the Internet: http://fuelourfuturenow.discoveryeducation.com/pdfs/dash-plus/Harker_Plan.pdf.
Allen Hong, The Linear-Logic ScanGauge II Review, Jun. 10, 2007.
Car Accelerometer details, 2011, Hurtado Apps—iPhone/iPod applications [On-line], Retrieved from the Internet: http://apps.hurtado.cl/car/car-details.
"Fall Detection with Three-Axis Accelerometer and Magnetometer in a Smartphone." Soo-Young Hwang et al., National University, Korea, retrieved on Apr. 15, 2015.
"OR Code." IDL Services. Retrieved from http://www.internationaler-fuehrerschein.com/en/the-idd/qr-code-quick-response-code-feature-in-the-idd.html on May 21, 2013.
"Speed-Breaker Early Warning System." Mohit Jain et al., retrieved on Apr. 15, 2015.
"Design and implementation of a smart card based healthcare information system." Geylani Kardas et al., Computer Methods and Programs in Biomedicine 81. pp. 66-78. Sep. 27, 2003.
"Design and Development of a GSM Based Vehicle Theft Control System and Accident Detection by Wireless Sensor Network." V.B.Gopala Krishna et al., International Journal of Emerging Trends in Engineering and Development, Issue 2, vol. 5, pp. 529-540. Jul. 2012.
"The Potential for Automatic Crash Notification Systems to Reduce Road Fatalities." Julie A. Lahausse et al., Annals of Advances in Automotive Medicine, vol. 52, pp. 85-92. 2008. (retrieved from http://www.ncbi.nlm.nih.gov/pmc/articles/PMC3256762/ on Jan. 12, 2013).
"Portable Automatic Conjecturing and Announcing System for Real-Time Accident Detection." C.F. Lai et al., International Journal on Smart Sensing and Intelligent Systems, vol. 2(9), Jun. 2009.
"Privacy Policy." Lemon Wallet. Retrieved from http://lemon.com/privacy on May 20, 2013.
Vitalijs Lennojs, aGile Dashboard, Dec. 19, 2008 [On-line], Retrieved from the Internet: http://iphoneapplicationlist.com/app/id300133977/.
What Can You Do With A Barometer, Joe Levi, Pocketnow, Oct. 19, 2011, <http://pocketnow.com/android/what-can-you-do-with-a-barometer-on-a-smartphone>.
Maciag, A. K. (1980). Motor accident insurance and systems of compensation. (Order No. MK49023, University of Alberta (Canada)). ProQuest Dissertations and Theses, 1. Retrieved from <http://search.proquest.com/docview/303097892?accountid=14753>. (303097892).
"New Idea: QR Codes for License Plates." Andrew Maxwell, Heka Interactive. Feb. 11, 2011. Retrieved from http://www.andrewcmaxwell.com/2011/02/new-idea-qr-codes-for-license-plates on May 21, 2013.

(56) References Cited

OTHER PUBLICATIONS

Glossary III: Rise of the Smartphonesa, Scott McCormick, May 12, 2011 <http://floatlearning.com/2011/05/glossary-iii-rise-of-the-smartphones/>.
"Mercedes-Benz mbrace™." Mercedes-Benz, Oct. 22, 2010.
"Microsoft Tag Implementation Guide: Practical requirements and recommendations to ensure successful Tag production." Microsoft Tag. Aug. 2010.
"Nericell: Rich Monitoring of Road and Traffic Conditions using Mobile Smartphones." Prashanth Mohan et al., Microsoft Research India, Bangalore, ACM, 2008.
"For insurance companies, the day of digital reckoning." Henrik Naujoks et al., Bain & Company. 2013.
Doug Newcomb, Cool iPhone Car Applications, Nov. 20, 2008 [On-line], Retrieved from the Internet: http://edmunds.com.
Released—GReddy iPhone and iPod App, Jun. 28, 2010, The Octane Report [On-line], Retrieved from the Internet: http://www.octanereport.com.
"Automatic Crash Response, Car Safety, & Emergency Services—OnStar" OnStar, retrieved from <http://www.onstar.onstar.om/web/portal/emergencyexplore?tab=1&g=1> on Jan. 12, 2013.
Barometer-Aided Road Grade Estimation, Jussi Parviainen et al., Tampere University of Technology, Finland; 2009.
Charles Petzold, Accelerometer and Location Service in Windows Phone 7, Nov. 23, 2010 [On-line], Retrieved from the internet: http://www.c-sharpcorner.com/UploadFile/8c85cf/4363/.
"Encrypted QR Codes." qrworld. Nov. 27, 2011. Retrieved from http://qrworld.wordpress.com/2011/11/27/encrypted-qr-codes on Nov. 12, 2013.
Dash3 Instruction Manual, 2010, Race Technology Limited [On-line], Retrieved from the Internet: http://www.race-technology.com.
Dash4 Pro, 2011, Race Technology Ltd. [On-line], Retrieved from the Internet: http://www.race-technology.com/dash4_pro_2_31014.html.
AX22 Performance Computer, Race Technology Ltd. [On-line], Retrieved from the Internet: http://www.race-technology.com.
"Providing Accident Detection in Vehicular Networks through OBD-II Devices and Android-based Smart Phones." M. Narsing Rao et al., International Journal of Science and Research (ISSN: 2319-7064), vol. 2(9), Sep. 2013.
Fleet Management Features, 2011, RedTail Telematics [On-line], Retrieved from the Internet: http://www.redtailtelematics.com/fleet-management/features/.
"Near Field Communication: A Simple Exchange of Information." Samsung. Mar. 5, 2011 Retrieved from http://www.samsung.com/us/article/near-field-communication-a-simple-exchange-of-information on May 21, 2011.
"License Plate Scanner Obsoletes Meter Maid." Bertel Schmitt, The Truth About Cars. Feb. 1, 2011. Retrieved from http://www.thetruthaboutcars.com/2011/02/license-plate-scanner-obsoletes-meter-maid on Jun. 28, 2013.
"Car insurance firms revving up mobile app features." Mark Chalon Smith, Insurance.com, Feb. 6, 2012. Retrieved from http://www.insurance.com/auto-insurance/auto-insurance-basics/car-insurance-mobile-apps.html on Jun. 28, 2013.
"Snooper UK Store—Buy Direct from the Manufacturer." Snooper, retrieved from <http://snooper.uk/products/snooper-lynx-app/index.html> on Apr. 15, 2015.
Spevacek, C. E., Ledwith, J. F., Newman, T. R., & Lennes, John B.,Jr. (2001). Additional insured and indemnification issues affecting the insurance industry, coverage counsel, and defense counsel—legal advice and practice pointers. FDCC Quarterly, 52(1), 3-101. Retrieved from <http://search.proquest.com/docview/201215466?accountid=14753>.

"Vehicle Wrap Trends: What are QR Codes and why do I need one?" Sunrise Signs. Retrieved from http://www.sunrisesigns.com/our-blog/bid/34661/Vehicle-Wrap-Trends-What-are-QR-Codes-and-why-do-I-need-one on May 21, 2013.
"Using Smartphones to Detect Car Accidents and Provide Situational Awareness to First Responders." Christopher Thompson, Institute for Software Integrated Systems, Vanderbilt University; presented at the Third International ICST Conference on Mobile Wireless MiddleWARE, Operating Systems, and Applications; retrieved Dec. 22, 2014.
"Using Smartphones and Wireless Mobile Sensor Networks to Detect Car Accidents and Provide Situational Awareness to Emergency Responders." Christopher Thompson et al., Vanderbilt University; retrieved Dec. 22, 2014.
Verma, M., R. Lange, and D. McGarry. "A Study of US Crash Statistics from Automated Notification Data." In 20th international technical conference on the enhanced safety of vehicles conference (ESV). Lyon, France, pp. 18-21. 2007.
Insurance, 2011, Webtech Wireless [On-line], Retrieved from the Internet: http://www.wtwmail.com/en/industry_solutions/insurance/.
"Top 10 Technology Trends Impacting Life and PC Insurers in 2013." Juergen Weiss et al., Gartner. Mar. 27, 2013.
"WreckWatch: Automatic Traffic Accident Detection and Notification with Smartphones." J. White et al., Journal of Mobile Networks and Applications manuscript, retrieved Apr. 15, 2015.
"Insurance Tech Trends 2013: Elements of postdigital." Mark White et al., Deloitte Development LLC. 2013.
"Bump (application)." Wikipedia. Retrieved from http://en.wikipedia.org/wiki/Bump_(application) on Aug. 29, 2013.
CS-525H: Immersive Human-Computer Interaction, Oct. 25, 2010, Department of Computer Science, Worcester Polytechnic Institute.
GForce, 2011 [On-line], Retrieved from the Internet: http://gadgitech.com/uk/IPhone/Applications/GForce.html.
gMeter, 2008 [On-line], Retrieved from the Internet: http://hunter.pairsite.com/gmeter/.
IHUD an Aerospace inspired spatial motion visualization on the iPhone 3G and 3GS, and iPad [On-line], [attached copy retrieved on Apr. 14, 2011], Retrieved from the Internet: http://www.i-hud.com/.
K.A.T. Matrix 3-Axis Accelerometer (Car Performance Meter), 2011 [On-line], Retrieved from the Internet: http://www.amazon.com
Race Technology Knowledge Base, 2008 [On-line], Retrieved from the Internet: http://www.race-technology.com/wiki/index.php/AnalysisTools.
"Introducing the Octagon Insurance Claims App," retrieved Jun. 3, 2016 from http://www.octagoninsurance.com/insurance-claim/octagon-insurance-mobile-claims-app., 3 pages.
"Insurance Claim Manager App," retrieved Jun. 3, 2016, from https://www.snappii.com/resource-center/snappii-insurance-claims-manager-app/, 4 pages.
"Liberty Mutual Mobile App: Connecting you to Liberty Mutual on the go," retrieved Jun. 3, 2016 from https://www.libertymutual.com/liberty-mutual-mobile/mobile-app, 4 pages.
"Vehicle Damage Claims," retrieved from Jun. 3, 2016 from https://www.statefarm.com/claims/resources/auto/vehicle-damage, 2 pages.
"Taking Advantage of the Pre-Claim Assistance Provision in your Professional Liability Policy," retrieved Jun. 3, 2016 from http://www.sugarmanlaw.com/News-Articles/ID/33/Taking-Advantage-of-the-Pre-Claim-Assistance-Provision_in_your-Professional_Liability_Policy, 2 pages.
"Financial Rights Legal Centre: Making a Claim on Your Car Insurance," retrieved from www.financialrights.org.au, 8 pages.
"When to File a Car Insurance Claim—and When Not To," retrieved Jun. 3, 2016 from https://www.nerdwallet.com/blog/insurance/when-to-file-car-insurance-claims/, 6 pages.
Apr. 13, 2015 (U.S.) U.S. Appl. No. 14/685,067.

\* cited by examiner

AUTOMATIC CRASH DETECTION

CROSS-REFERENCE TO RELATED APPLICATIONS

This application is a continuation of pending U.S. patent application Ser. No. 15/665,710, filed Aug. 1, 2017 and entitled "Automatic Crash Detection," which is a continuation of pending U.S. patent application Ser. No. 14/685,067, filed Apr. 13, 2015 and entitled "Automatic Crash Detection." Each of the prior applications is incorporated herein by reference in its entirety.

TECHNICAL FIELD

Aspects of the disclosure generally relate to the detection of vehicle crashes using sensors and computing devices, which may be integrated into mobile devices.

BACKGROUND

Typically, drivers of vehicles involved in crashes (or in some cases, emergency personnel) report crashes to insurance providers days or even weeks after the crash. The delay in reporting crashes often results in a delay in processing insurance claims. The information that the driver gives to his or her insurance provider after the fact might also be incomplete or vague. For example, the driver might have forgotten the location of the accident.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to systems, methods, and computing devices, such as a mobile computing device comprising an accelerometer configured to measure acceleration of at least one axis of the accelerometer, a processor, and memory storing computer-executable instructions that, when executed by the processor, cause the processor of the mobile computing device to receive acceleration events measured by the accelerometer and determine whether a number of the acceleration events measured by the accelerometer exceeds a threshold number of acceleration events during a predetermined time window. If the number of the acceleration events measured by the accelerometer exceeds the threshold number of acceleration events, a determination that the mobile computing device is within a vehicle and that the vehicle was involved in a crash may be made. On the other hand, if the number of acceleration events measured by the accelerometer does not exceed the threshold number of acceleration events, a determination that the vehicle was not involved in a crash may be made.

The mobile computing device described herein may have memory storing additional computer-executable instructions that, when executed by the processor of the mobile computing device, cause the process of the mobile computing device to determine whether each of the acceleration events exceeding the threshold number of acceleration events has a magnitude exceeding an acceleration magnitude threshold. Determining that the vehicle was involved in the crash may comprise determining that the vehicle was involved in the crash if the number of acceleration events measured by the accelerometer exceeds the threshold number of acceleration events, and each of the acceleration events exceeding the threshold number of acceleration events has a magnitude exceeding the acceleration magnitude threshold.

In some aspects, the acceleration events may comprise acceleration events having a magnitude exceeding an acceleration magnitude threshold. The accelerometer may comprise three axes, and the magnitude may comprise at least one of a sum of the absolute values of each of the three axes of the accelerometer, a sum of the squares of each of the three axes of the accelerometer, and a magnitude of a single axis of the accelerometer. Additionally or alternatively, the acceleration magnitude threshold may comprise a plurality of acceleration magnitude thresholds, and the memory of the mobile computing device may store additional computer-executable instructions that, when executed by the processor, cause the processor of the mobile computing device to determine a severity of the crash based on whether one or more of the plurality of acceleration magnitude thresholds has been exceeded and responsive to determining that the vehicle was involved in the crash.

The time window disclosed herein may comprise a number of acceleration samples measured periodically by the accelerometer. Additionally or alternatively, the time window may comprise a time value greater than 5 milliseconds.

In some aspects, the mobile computing device may further comprise communication circuitry configured to wirelessly communicate with other devices. The memory of the mobile computing device may store additional computer-executable instructions that, when executed by the processor, cause the processor of the mobile computing device to send, via the communication circuitry and to a crash detection server, a message comprising information identifying an owner of the mobile computing device, information identifying the mobile computing device, and information identifying a location of the mobile computing device. The message may be sent responsive to a determination that the vehicle was involved in the crash. The mobile computing device may comprise a mobile phone, and the memory of the mobile phone may store additional computer-executable instructions that, when executed by the processor, cause the processor of the mobile phone to receive, via the communication circuitry, a phone call. The phone call my be received responsive to the message being sent to the crash detection server.

Aspects of the disclosure relate to systems and methods for identifying, by a mobile computing device, a time window, an acceleration magnitude threshold, and a number of acceleration events threshold. The system and method may include a determination of a number of acceleration events measured by an accelerometer of the mobile computing device exceeding the acceleration magnitude threshold during the time window. The system and method may also include a determination that a the mobile computing device is within a vehicle and that the vehicle was involved in a crash responsive to determining that the number of acceleration events measured by the accelerometer of the mobile computing device exceeding the acceleration magnitude threshold also exceeds the number of acceleration events threshold.

The systems and methods disclosed herein may include a determination of a location of the mobile computing device and a confirmation that the crash occurred based on the location of the mobile computing device. Moreover, the mobile computing device may identify a second acceleration magnitude threshold greater than the acceleration magnitude threshold. A determination of a second number of acceleration events measured by the accelerometer of the mobile computing device exceeding both the acceleration magnitude threshold and the second acceleration magnitude threshold may be made. The severity of the crash may be determined based on the number of acceleration events exceeding the acceleration magnitude threshold and the second number of acceleration events exceeding both the acceleration magnitude threshold and the second acceleration magnitude threshold.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
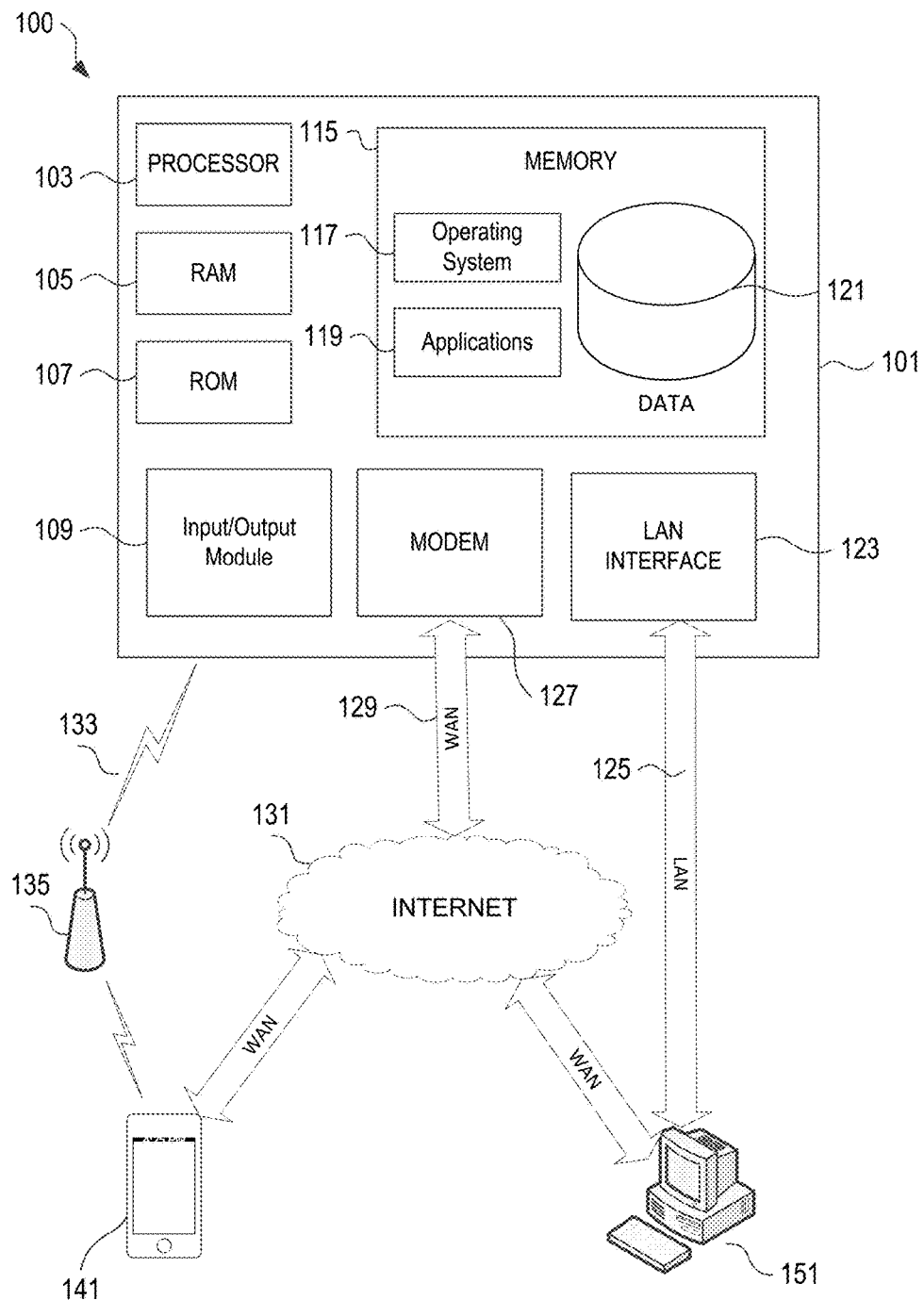
FIG. 1 illustrates a network environment and computing systems that may be used to implement aspects of the disclosure.

FIG. 1 illustrates a block diagram of a computing device 101 in a crash detection system 100 that may be used according to one or more illustrative embodiments of the disclosure. The crash detection computing device 101 may have a processor 103 for controlling overall operation of the computing device 101 and its associated components, including RAM 105, ROM 107, input/output module 109, and memory unit 115. The computing device 101, along with one or more additional devices (e.g., terminals 141, 151) may correspond to any of multiple systems or devices, such as crash detection computing devices or systems, configured as described herein for transmitting and receiving sensor data, detecting a crash, and confirming that the crash (rather than a non-crash event) occurred. Sensor data can include data collected from mobile devices (e.g., the driver's mobile phone), vehicle sensors, and/or on-board diagnostic (OBD) systems.

Input/Output (I/O) module 109 may include a microphone, keypad, touch screen, and/or stylus through which a user of the computing device 101 may provide input, and may also include one or more of a speaker for providing audio input/output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the crash detection computing device 101 to execute a series of computer-readable instructions to transmit or receive sensor data, process sensor data, and determine or confirm crash and non-crash events from the sensor data.

The crash detection computing device 101 may operate in a networked environment 100 supporting connections to one or more remote computers, such as terminals/devices 141 and 151. Crash detection computing device 101, and related terminals/devices 141 and 151, may include devices installed in vehicles, mobile devices that may travel within vehicles, or devices outside of vehicles that are configured to receive and process vehicle and other sensor data. Thus, the crash detection computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, sensor and telematics devices), or mobile communication devices (e.g., mobile phones, portable computing devices, and the like), and may include some or all of the elements described above with respect to the crash detection computing device 101. The network connections depicted in FIG. 1 include a local area network (LAN) 125 and a wide area network (WAN) 129, and a wireless telecommunications network 133, but may also include other networks. When used in a LAN networking environment, the crash detection computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle sensing and telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and crash detection system components described herein may be configured to communicate using any of these network protocols or technologies.

Additionally, one or more application programs 119 used by the crash detection computing device 101 may include computer executable instructions (e.g., sensor data analysis programs, crash detection algorithms, and the like) for transmitting and receiving sensor and crash data and performing other related functions as described herein.

Sensor data may refer to information pertaining to one or more actions or events performed by a vehicle and can include aspects of information identified or determined from data collected from a vehicle or mobile device. Sensor data can include, for example, location data, speed or velocity data, acceleration data, presence data, time data, direction data, mobile device orientation data, rotation/gyroscopic data, and the like.

Figure 2:
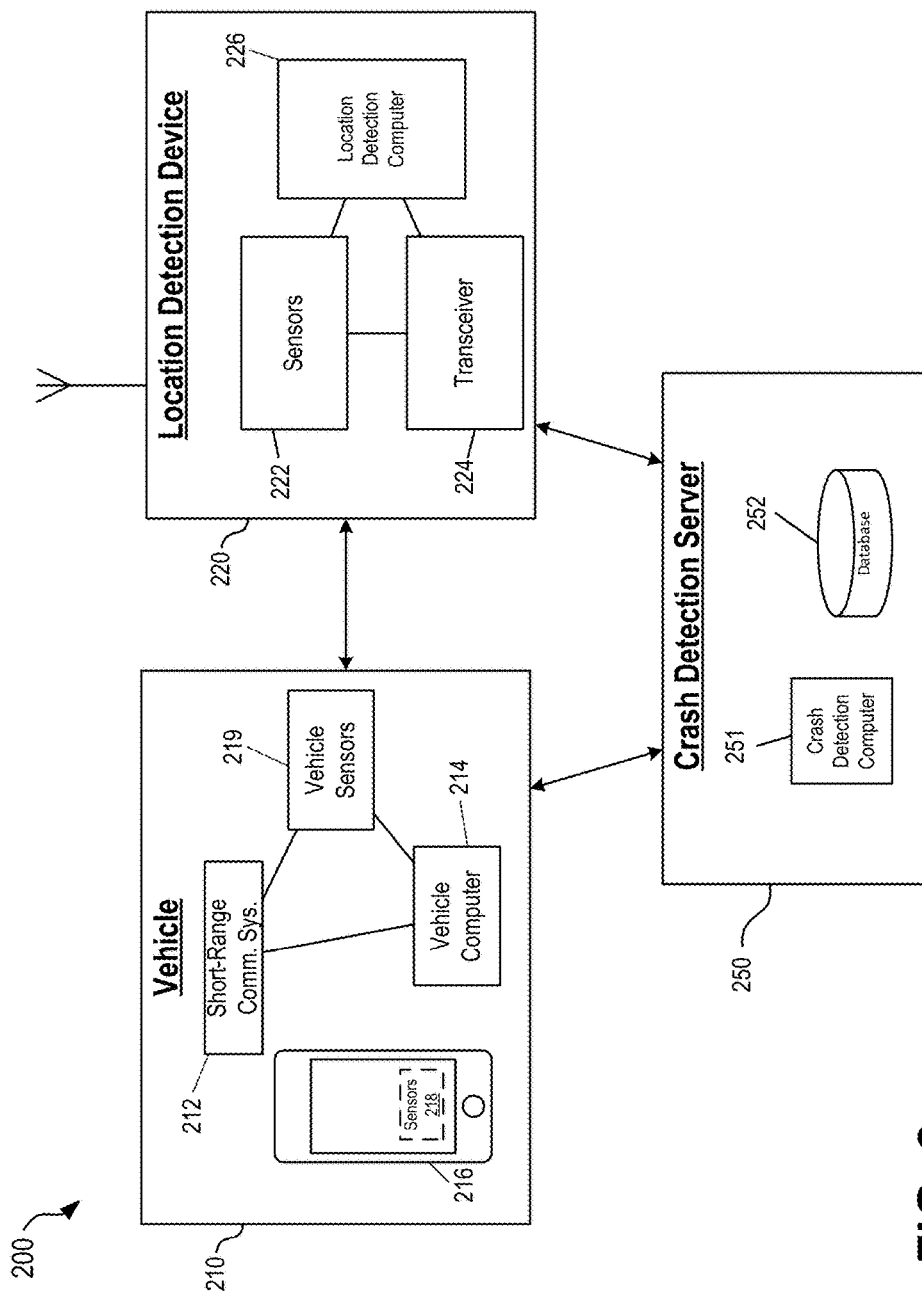
FIG. 2 is a diagram illustrating various example components of a crash detection system according to one or more aspects of the disclosure.

FIG. 2 is a diagram illustrating various example components of a crash detection system 200 according to one or more aspects of the disclosure. The crash detection system 200 may include a vehicle 210, other vehicles (not illustrated), a location detection system 220, a crash detection server 250, and additional related components. Each component shown in FIG. 2 may be implemented in hardware, software, or a combination of the two. Additionally, each component of the crash detection system 200 may include a computing device (or system) having some or all of the structural components described above for computing device 101.

Vehicle 210 may be, for example, an automobile, motorcycle, scooter, bus, recreational vehicle, boat, or other vehicle for which sensor or crash data may be collected and analyzed. A mobile computing device 216 within the vehicle 210 may be used to collect sensor or crash data (e.g., via sensors 218) and/or to receive sensor or crash data from the vehicle 210 (e.g., via vehicle sensors 219). The mobile device 216 may process the data to detect a crash or non-crash event and/or transmit the sensor or crash data to the crash detection server 250 or other external computing devices. Mobile computing device 216 may be, for example, mobile phones, personal digital assistants (PDAs), tablet computers, laptop computers, smartwatches, and other devices that may be carried by drivers or passengers inside or outside of the vehicle 210. The mobile computing device 216 may contain some or all of the hardware/software components as the computing device 101 depicted in FIG. 1. Software applications executing on the mobile device 216 may be configured to receive sensor data from sensors 218, such as acceleration, velocity, location, and the like and/or communicate with vehicle sensors 219 or other vehicle communication systems to sense or receive driving data. For example, mobile device 216 equipped with Global Positioning System (GPS) functionality may determine vehicle location, speed, direction and other basic driving data without needing to communicate with vehicle sensors or external vehicle systems. In other examples, software on the mobile device 216 may be configured to receive some or all of the sensed data collected by sensors 219 of the vehicle 210.

When mobile computing device 216 within the vehicle 210 is used to sense vehicle data, the mobile computing device 216 may store, analyze, and/or transmit the vehicle data to one or more other computing devices. For example, mobile device 216 may transmit vehicle data directly to crash detection server 250, and thus may be used instead of sensors or communication systems of the vehicle 210.

The mobile device 216 may include various sensors 218 capable of detecting and recording conditions at and operational parameters of the vehicle 210 if the mobile device 216 is inside the vehicle. The sensors 218 may be used to sense, for example, the location of the mobile device 216, such as the GPS coordinates (e.g., latitude and longitude). The location of the mobile device 216 may also be determined based on wireless networks the mobile device has connected to, such as Wi-Fi networks, cellular networks, and the like. Images taken by a camera of the mobile device 216 may also be used to determine the location. For example, the mobile device may capture an image before, during, or after the accidents, and the captured image may be compared to images stored in one or more databases (e.g., databases of a search engine). Once a match is found, the location of the mobile device 216 may be determined based on the tagged location of the matching image in the database. In some aspects, location may be detected, for example, at least once per second (e.g., 60 Hz).

The sensors 218 of the mobile device 216, such as a GPS and/or a compass, may sense the speed and/or direction at which the mobile device 216 (and accordingly vehicle 210) is traveling. An accelerometer of the mobile device 216 may sense the acceleration of the mobile device. A gyroscope may be used to determine the orientation of the mobile device. In some aspects, orientation may be detected, for example, at a rate of 90 Hz. The gyroscope may also be used to measure the speed of rotation of the mobile device 216. A magnetometer may be used to measure the strength and direction of the magnetic field relative to the mobile device. The sensors 218 previously described are exemplary, and the mobile device 216 may include any other sensors used for crash detection.

The data collected by the mobile device 216 may be stored and/or analyzed within the mobile device 216. The processing components of the mobile computing device 216 may be used to analyze sensor data, determine that a crash has or has not occurred, and confirm whether or not the crash has occurred. Additionally or alternatively, the mobile device 216 may transmit, via a wired or wireless transmission network, the data to one or more external devices for storage or analysis, such as vehicle computer 214 or crash detection server 250. In other words, mobile computing device 216 may be used in conjunction with, or in place of, the vehicle computer 214 or crash detection server 250 to detect crashes.

The vehicle computer 214 of the vehicle 210 may contain some or all of the hardware/software components as the computing device 101 depicted in FIG. 1. The vehicle computer 214 may receive sensor or crash data from the mobile device 216 and/or from sensors 219 built into the vehicle 210. For example, vehicle computer 214 may receive accelerometer data from the mobile device 216 or an accelerometer in the vehicle 210 and use the accelerometer data to determine whether or not a crash has occurred. Additionally or alternatively, the vehicle computer 214 may act as a gateway device between the mobile device 216 and the crash detection server 250. For example, the vehicle computer 214 may receive sensor data (or data indicating that a crash has occurred) from the mobile device 216 and forward the received data to the crash detection server 250. The vehicle 210 may include a short-range communication system 212, which will be described in further detail below.

The system 200 may include a crash detection server 250, containing some or all of the hardware/software components as the computing device 101 depicted in FIG. 1. The crash detection server 250 may include hardware, software, and network components to receive data from one or more vehicles 210 (e.g., via vehicle computer 214), mobile device 216, and other data sources. The crash detection server 250 may include a driving and driver data database 252 and crash detection computer 251 to respectively store and analyze data received from vehicles, mobile devices, and other data sources. The crash detection server 250 may initiate communication with and/or retrieve data from vehicle 210 wirelessly via vehicle computer 214, mobile device 216, or by way of separate computing systems over one or more computer networks (e.g., the Internet). Additionally, the crash detection server 250 may receive additional data from other non-vehicle or mobile device data sources, such as external databases containing driver information (e.g., the driver's name, license number, home or work address, and the like) and vehicle information (e.g., Vehicle Identification Number (VIN), license plate number, vehicle make and model, and the like).

The crash detection computer 251 may be configured to retrieve data from the database 252, or may receive driving data directly from vehicle 210, mobile device 216, or other data sources. The crash detection computer 251 may perform crash detection analyses and other related functions, as will be described in further detail in the examples below. The analyses described herein may be performed entirely in the crash detection computer 251 of the crash detection server 250, entirely in the vehicle computer 214, or entirely in the mobile device 216. In other examples, certain analyses may be performed by vehicle computer 214, other analyses may be performed by the crash detection computer 251, and yet other analyses may be performed by the mobile device 216.

The system 200 may also include an external location detection device 220, containing some or all of the hardware/software components as the computing device 101 depicted in FIG. 1. The location detection device 220 may be used to determine the location of the mobile device 216 and/or vehicle 210. The location detection device 220 may include one or more location sensors 222, transceivers 224 for transmitting and receiving data, and a location detection computer 226 used to process data and determine the location of the mobile device 216 and/or vehicle 210. In some aspects, the location of the mobile device 216 may be determined using GPS, and the location detection device 220 may comprise one or more GPS satellites. Location may also be determined using one or more Wi-Fi network, and the location detection device 220 may comprise one or more Wi-Fi access points. Location may also be determined using one or more cellular network, and the location detection device 220 may comprise one or more cellular network towers. Location may also be determined using captured images, and the location detection device 220 may comprise an on-road camera.

In some aspects, the location of the mobile device 216 and/or vehicle 210 may be determined using another mobile device and/or vehicle. For example, vehicle 210 may be configured to perform vehicle-to-vehicle (V2V) communications, by establishing connections and transmitting/receiving vehicle data to and from other nearby vehicles using short-range communication system 212.

Short-range communication system 212 is a vehicle-based data transmission system configured to transmit vehicle data to other nearby vehicles, and to receive vehicle data from other nearby vehicles. In some examples, communication system 212 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the short-range communication system 212 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The V2V transmissions between the short-range communication system 212 and another vehicle's communication system may be sent via DSRC, Bluetooth, satellite, GSM infrared, IEEE 802.11, WiMAX, RFID, and/or any suitable wireless communication media, standards, and protocols. In certain systems, the short-range communication system 212 may include specialized hardware installed in vehicle 210 (e.g., transceivers, antennas, etc.), while in other examples the communication system 212 may be implemented using existing vehicle hardware components (e.g., radio and satellite equipment, navigation computers) or may be implemented by software running on the mobile device 216 of drivers and passengers within the vehicle 210.

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle data to the other vehicles and/or devices.

The types of vehicle data transmitted by the vehicle 210 may depend on the protocols and standards used for the V2V communication, the range of communications, whether a crash has been detected, and other factors. In certain examples, the vehicle 210 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 210 internal systems that the vehicle is skidding, that an impact has occurred, or that the vehicle's airbags have been deployed, also may be transmitted in V2V communications.

The mobile computing device 216 may be used instead of, or in conjunction with, short-range communication system 212. For example, the mobile device 216 may communicate directly with the other vehicle or directly with another mobile device, which may be inside or outside of the other vehicle. Additionally or alternatively, the other vehicle may communicate location information to vehicle 210, and vehicle 210 may in turn communicate this location information to the mobile device 216. Any data collected by any vehicle sensor or mobile device 216 sensor may be transmitted via V2V or other communication to other nearby vehicles, mobile devices, or infrastructure devices receiving V2V communications from communication system 212 or communications directly from mobile device 216. Further, additional vehicle driving data not from the vehicle's sensors (e.g., vehicle make/model/year information, driver information, etc.) may be collected from other data sources, such as a driver's or passenger's mobile device 216, crash detection server 250, and/or another external computer system, and transmitted using V2V communications to nearby vehicles and other transmitting and receiving devices using communication system 212.

Systems and methods described herein may detect vehicle crashes (e.g., accidents) based on the number of high magnitude accelerometer readings within a particular time window. For example, a computing device 101 may receive five samples of accelerometer readings made within a time window. The computing device 101 may determine that a crash has occurred if the magnitude of three or more of the accelerometer readings is greater than a threshold. Otherwise, the computing device 101 may determine that a non-crash event occurred, such as the mobile device 216 being dropped or a hard braking event of the vehicle 210. The previous description is merely exemplary, and additional examples of the crash detection system 200 and method performed by the system are described below.

Figure 3:
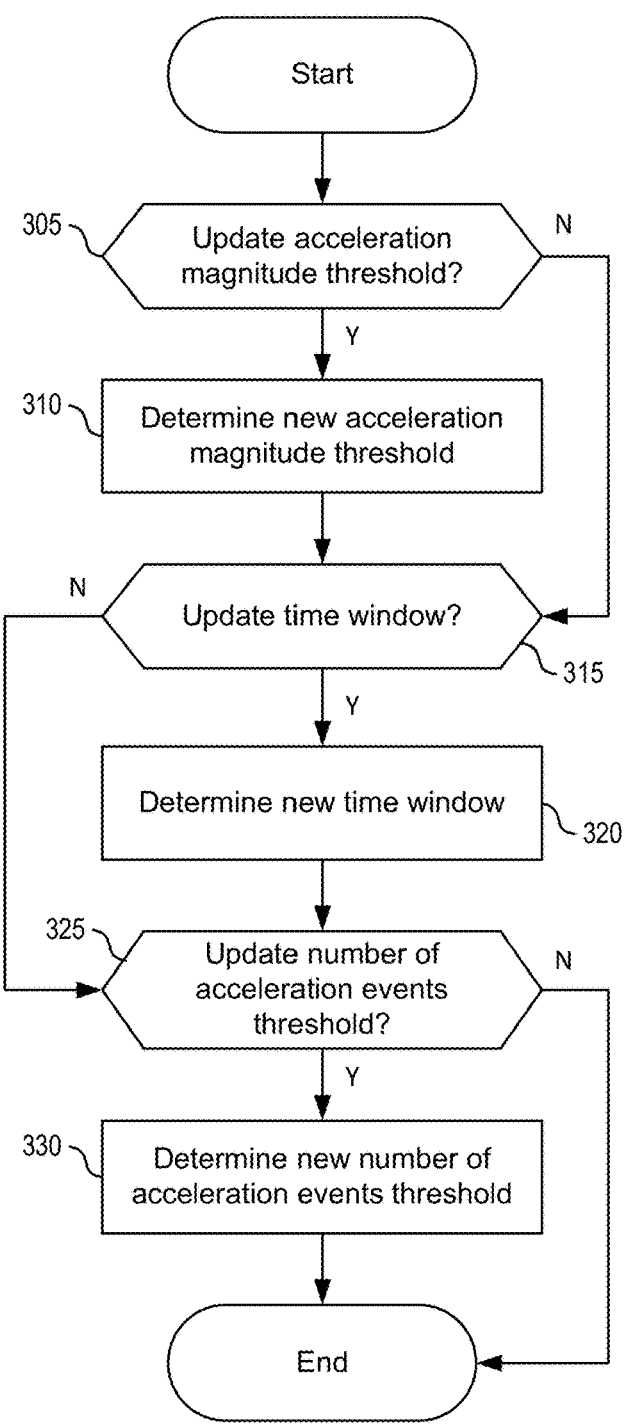
FIG. 3 is a flow diagram illustrating an example method of initializing a crash detection system according to one or more aspects of the disclosure.

FIG. 3 is a flow diagram illustrating an example method of initializing a crash detection system according to one or more aspects of the disclosure. As will be described below, various parameters, such as the acceleration magnitude threshold, the time window, and/or the number of acceleration events threshold may be updated in order to improve the accuracy of the crash detection algorithm described herein. The updates may be based on an analysis of crash and non-crash data collected from a plurality of mobile devices and/or from a plurality of vehicles and used to improve the crash detection algorithm (e.g., to yield better results through data analysis). The example of FIG. 3 may be performed by one or more computing devices in a crash detection system 200, such as vehicle computer 214, a crash detection computer 251, a mobile computing device 216, and/or other computer systems.

In step 305, a computing device, such as the crash detection server 250 or mobile device 216, may determine whether to update an acceleration magnitude threshold. The acceleration magnitude threshold may be used alone or in combination with the number of high acceleration events within a time window to determine whether a crash has occurred. As will be described in further detail in the examples below, a computing device may use the acceleration magnitude threshold to distinguish between a crash event (e.g., magnitude of acceleration exceeding the threshold) and a hard braking event (e.g., magnitude of acceleration not exceeding the threshold).

The magnitude and direction of acceleration may be measured by, for example, an accelerometer of the mobile device 216 and/or vehicle 210. The accelerometer may include three different axes (i.e., x-axis, y-axis, and z-axis), and acceleration measurements may be taken for each axis. The magnitude of acceleration for the purposes of crash detection may be determined using any number of methods. For example, the magnitude of acceleration may be determined based on the sum of the absolute values of all three axes of the accelerometer, as illustrated in the following algorithm:

$$|x|+|y|+|z|$$

The computing device may add an offset to the axis corresponding to the direction of gravity in order to account for the effect of gravity on acceleration measurements. For example, if the direction of gravity corresponds to the z axis, and acceleration is measured using the standard gravity unit of measurement (G or 9.8 m/s$^2$), the following algorithm may be used to determine the magnitude of acceleration for the purposes of crash detection:

$$|x|+|y|+|z+1|$$

Alternatively, if the orientation of the mobile device 216 is unknown, a high-pass filter may be used to remove the effect of gravity. The magnitude of acceleration may alternatively be determined based on the sum of the squares of all three axes of the accelerometer, as illustrated in the following algorithm:

$$x^2+y^2+z^2$$

The computing device may add an offset to the axis corresponding to the direction of gravity, such as the z-axis, as illustrated in the following algorithm:

$$x^2+y^2+(z+1)^2$$

In some aspects, the magnitude of acceleration may be determined using the magnitude of a single axis of the accelerometer. If a single axis is used, the computing device may choose the axis to measure based on the orientation of the mobile device 216. For example, the gyroscope and compass of the mobile device 216 may be used to determine the orientation of mobile device, such as by determining the direction of the force of gravity. The orientation of the mobile device may be fixed by a cradle attached to the vehicle 210 (e.g., the windshield or dashboard of the vehicle 210) configured to hold the mobile device. The mobile device 216 and/or vehicle 210 may detect whether the mobile device 216 is in the cradle using, for example, wired connections (e.g., if the mobile device 216 is plugged into the cradle), wireless connections (e.g., near-field communication (NFC), wireless charging, etc.), or presence sensors (e.g., light sensors on the mobile device 216 or cradle, which may be covered when the mobile device 216 is placed in the cradle). If the mobile device 216 is fixed by the cradle, the computing device may select the appropriate axis (or axes) to measure for acceleration, such as the x-axis, the y-axis, the z-axis, or a combination thereof. Each axis may use a different acceleration magnitude threshold for the purposes of determining a crash or non-crash event.

Returning to FIG. 3, in step 310, the computing device may determine a new acceleration magnitude threshold if the computing device determined in step 305 to update the threshold. The threshold may be updated in order to improve the accuracy of the crash detection algorithm, based on an analysis of crash and non-crash data collected from a plurality of mobile devices and/or from a plurality of vehicles. The threshold may also be updated based on the size of the vehicle 210. For example, a heavier vehicle (e.g., having a weight greater than a threshold, such as 4000 lbs.) may use a higher threshold to trigger a detection of a crash because heavier vehicles have more inertia and may experience larger force during a crash. A lighter vehicle (e.g., having a weight less than a threshold, such as 4000 lbs.) may use a lower threshold to trigger a detection of a crash because lighter vehicles have less inertia than heavier vehicles.

Exemplary, non-limiting acceleration magnitude thresholds include 3G, 4G, and 8G. In some aspects, the computing device may use multiple acceleration magnitude thresholds to determine the severity of the crash. For example, the computing device may be configured for three thresholds: 3G, 8G, and 60G. If the magnitude of acceleration is below 3G, the computing device may determine that a crash did not occur. If the magnitude of acceleration is between 3G and 8G, the computing device may determine that a minor crash occurred. If the magnitude of acceleration is between 8G and 60G, the computing device may determine that a moderate crash occurred. If the magnitude of acceleration is above 60G, the computing device may determine that a severe crash occurred. While the above example uses three thresholds, any number of thresholds (and thus levels of severity) may be used.

In some aspects, the threshold selected may depend on the configuration and capabilities of the accelerometer in the mobile device 216 or vehicle 210. For example, if the accelerometer is capable of measuring accelerations of up to +/−16G, the computing device may select any threshold value(s) less than 16G.

In step 315, the computing device may determine whether to update a time window. The time window may establish a period of time for which the computing device makes acceleration measurements for the purposes of determining a crash. The time window may be represented as a time value, such as 5 milliseconds. Alternatively, the time window may be represented as a number of acceleration measurements, such as 7 measurements, if the accelerometer makes periodic measurements (e.g., 125 measurements per second or 125 Hz). In the latter example, the time value for the time window may be 5.6 milliseconds (i.e., 7 measurements÷125 measurements/second). 125 Hz is merely exemplary, and other non-limiting examples include 90 Hz and 100 Hz. Other exemplary, non-limiting examples of the number of acceleration measurements include 3, 5, and 10 measurements. As will be described in further detail in the examples below, a computing device may determine whether the number of high magnitude acceleration measurements within the time window exceed a threshold number of acceleration measurements. In step 320, the computing device may determine a new time window if the computing device determined in step 315 to update the window. The time window may be updated in order to improve the accuracy of the crash detection algorithm, based on an analysis of crash and non-crash data collected from a plurality of mobile devices and/or from a plurality of vehicles. The time window may be increased to screen out noise or to observe multiple collisions that occur during a crash.

In step 325, the computing device may determine whether to update a threshold number of acceleration events. In step 330, the computing device may determine a new threshold number of acceleration events if the computing device determines to update the threshold in step 325. The threshold number of acceleration events may be used in combination with the acceleration magnitude threshold and time window previously described to determine whether a crash has occurred. For example, if the number of high magnitude acceleration events during the time window exceeds the threshold number of acceleration events, the computing device may determine that a crash occurred. Otherwise, the computing device may determine that a non-crash event occurred, such as the mobile device being dropped. In some aspects, the time window described above may be chosen to be long enough to distinguish the short duration of a dropped phone's impact with a surface from the longer duration of a vehicle crash. For example, the period of time may be greater than or equal to 5 milliseconds.

As previously described, each of the acceleration magnitude threshold, the time window, and/or the number of acceleration events threshold may be updated according to the steps illustrated in FIG. 3. The updated values may be sent as an update to an application on the mobile device 216 (e.g., in the case of a mobile deployment) or as a firmware update (e.g., in the case of a device deployment).

A brief, non-limiting example of a computing device using the acceleration magnitude threshold, time window, and number of acceleration events threshold will now be described. Assume that the acceleration magnitude threshold is 4G, time window is 5 measurements (or 4 milliseconds measured periodically at 125 Hz), and the number of acceleration events threshold is 3 measurements. The computing device may receive 5 acceleration measurements from the accelerometer during the time window and determine the magnitude of acceleration for each of the 5 measurements. If the magnitude of acceleration for at least 3 of the measurements exceeds 4G, the computing device may determine that a crash occurred. Otherwise, the computing device may determine that a non-crash event occurred, such as the phone being dropped or a hard braking event. Additional examples of crash detection will now be provided with reference to FIG. 4.

Figure 4:
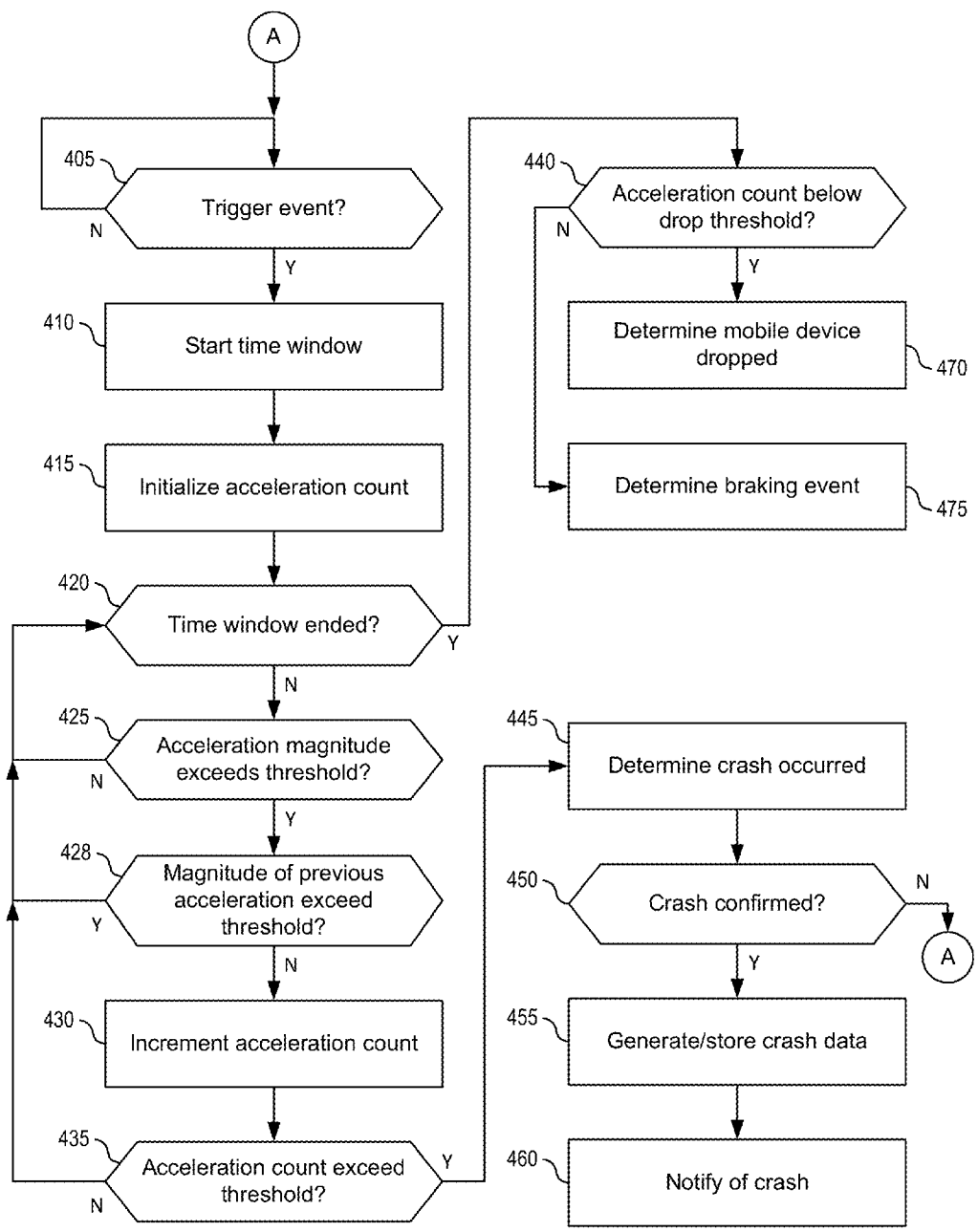
FIG. 4 is a flow diagram illustrating an example method of detecting a crash according to one or more aspects of the disclosure.

FIG. 4 is a flow diagram illustrating an example method of detecting a crash according to one or more aspects of the disclosure. The example of FIG. 4 may be performed by one or more computing devices in a crash detection system 200, such as vehicle computer 214, a crash detection computer 251, a mobile computing device 216, and/or other computer systems.

In step 405, a computing device may determine whether a trigger event has occurred. The trigger event may indicate the possibility of a crash, such as a magnitude of acceleration that exceeds an acceleration magnitude threshold. In some aspects, a threshold smaller than the acceleration magnitude threshold may be used to trigger the computing device to initiate detection of a crash. The trigger event may also be based on GPS measurements. For example, the computing device may determine that a trigger event has occurred if the change in speed measured by the GPS system of the mobile device 216 (or vehicle 210) is greater than a certain threshold. The computing device may wait for a trigger event before proceeding to step 410.

In step 410, the computing device may start the time window for taking acceleration measurements. As previously explained, the time window may comprise a time period and/or a number of measurements to take (e.g., if the acceleration measurements are periodically taken, such as every millisecond). The computing device may also initialize the time window to t=0 (the base time). In step 415, the computing device may initialize an acceleration count, which may be used to track the number of high acceleration events detected during the time window. The acceleration count may be initialized to 0 if the event that triggered the start of the time window is not included in the acceleration count, such as if the magnitude of the acceleration event trigger did not exceed the acceleration magnitude threshold or if the event is not otherwise to be counted. On the other hand, the acceleration count may be initialized to 1 if the magnitude of the acceleration event trigger exceeded the acceleration magnitude threshold or if the event is otherwise to be counted.

Instead of waiting for a trigger event (step 405) to trigger the time window (step 410) and to initialize the acceleration count (step 415), the computing device may use a rolling time window. Sensor data, such as acceleration data and/or GPS data, may be periodically made by and stored in, for example, the mobile device 216's memory. When a new sensor reading is made, the computing device may drop the oldest reading in the time window and add the new reading to the window.

In step 420, the computing device may determine whether the time window has ended. For example, if the time window is 5 milliseconds, the computing device may determine that the time window has ended when t=5 ms. If the time window is 5 measurements, the computing device may determine that the time window has ended when 5 measurements have been taken since the beginning of the time window.

If the time window has not ended (step 420: N), in step 425, the computing device may determine whether the magnitude of the acceleration for the currently sampled acceleration exceeds the acceleration magnitude threshold. For example, if the threshold is 4G and the magnitude of the current acceleration sample is 2.5G (step 425: N), the computing device may return to step 420 to determine whether the time window has ended and/or to take the next measurement. On the other hand, if the magnitude of the current acceleration sample is 4.6G (step 425: Y), the computing device may proceed to step 428.

In step 428, the computing device may optionally determine whether the previous acceleration sample (e.g., immediately previous acceleration sample) also exceeded the acceleration magnitude threshold. If the previous sample did not exceed the threshold (step 428: N), the computing device may proceed to step 430 and increment the acceleration count. On the other hand, if the previous sample exceeded the threshold (step 428: Y), the computing device might not increment the acceleration count and instead return to step 420. In other words, the computing device may optionally determine whether a crash has occurred based on the number of non-consecutive acceleration readings above the acceleration magnitude threshold. The computing device might not rely on consecutive acceleration samples. In other words, and as will be described below, the computing device may determine that a crash occurred based on either consecutive acceleration samples or non-consecutive acceleration samples.

In step 435, the computing device may determine whether the acceleration count within the time window has exceeded the number of acceleration events threshold. For example, if the threshold is two high magnitude acceleration events and the acceleration count is two (step 435: N), the computing device may return to step 420 to determine whether the time window has ended and/or to take the next measurement. On the other hand, if the acceleration count is three (step 435: Y), the computing device may proceed to step 445 and determine that a crash has occurred. The computing device may also determine that the mobile device is located within the vehicle involved in the crash. As previously explained, the computing device may determine the severity of the crash based on a plurality of acceleration magnitude thresholds. For example, if one, some, or all of the measured magnitudes exceeds a high threshold, the computing device may determine that a severe crash occurred. If one, some, or all of the magnitudes falls between a medium and high threshold, the computing device may determine that a moderate crash occurred. If one, some, or all of the magnitudes falls between a low and medium threshold, the computing device may determine that a minor crash occurred. If the mobile device 216 or vehicle computer 214 determines that a crash occurred in step 445, the device may generate a message indicating the crash and send the message to, for example, crash detection server 250.

In step 450, the computing device may confirm whether a crash occurred by analyzing additional data. In some aspects, the computing device may confirm the accident based on GPS readings. For example, the computing device may confirm the accident based on the change in speed of the vehicle 210 being greater than a threshold (e.g., indicating a hard stop or deceleration) and the GPS coordinates of the vehicle after the hard stop or deceleration falling within a certain radius of the location of the hard stop or deceleration for a particular length of time (e.g., thirty seconds).

A JavaScript Object Notation (JSON) algorithm may be used for crash determination and confirmation, as previously described. An exemplary JSON structure may be as follows:

```
{
    "gps":{
        "deceleration":0.33,
        "stop_def_radius":50,
        "stop_wait_time:30
    }
    "accelerometer":{
        "window_length":7,
        "breach_threshold":5,
        "num_breaches":3
    }
}
```

A JSON dictionary may include keys for "gps" and "accelerometer." The following table illustrates the keys for "accelerometer":

| Key | Definition |
| --- | --- |
| window_length | Number of x, y, and z acceleration readings considered (time window) |
| breach_threshold | Threshold for determining when the acceleration is considered high. Units may be G = 9.81 m/s$^2$ |
| num_breaches | Number of acceleration readings within the window for which the magnitude of acceleration exceeds the breach_threshold for a crash |

The following table illustrates the keys for "gps":

| Key | Definition |
| --- | --- |
| deceleration | Threshold the difference in speed should be below. Units may be G = 9.81 m/s$^2$ |
| stop_def_radius | Radius a number of GPS readings after the hard deceleration should lie within. Units may be meters |
| stop_wait_time | Number of readings after the hard deceleration that should fall within the stop_def_radius. Units may be seconds |

The above JSON configuration example may be used to determine and confirm a crash in the following scenario. The GPS trail may show a magnitude of deceleration of 0.33G followed by the vehicle not moving more than 50 m in 30 s. Within an acceleration window of length 7 (e.g., a time value of 7/90 seconds for 90 Hz sampling) starting at the same time as the above GPS deceleration event, at least 3 of the 7 acceleration magnitude readings exceeds 5G.

Additionally or alternatively, the computing device may confirm (after detecting) the crash based on the location of the mobile device 216 and/or vehicle 210. For example, if the computing device determines that the mobile device 216 is on a road (or within a predetermined radius from a road), the computing device may confirm the crash. Otherwise, the computing device may determine that a crash did not occur. The location of the mobile device 216 and/or vehicle 210 may be determined using the location detection device 220, as previously described. The computing device may determine the existence of a road by accessing a database of maps, such as GPS or search engine maps. If the crash is not confirmed (step 450: N), the computing device may return to step 405 to determine whether another trigger event has occurred. If the crash is confirmed (step 450: Y), the computing device may proceed to step 455.

In step 455, the computing device may generate and/or store the crash data, such as the number of acceleration events counted, the severity of the crash, and the threshold values. The computing device may also generate and/or store the location of the crash, the time of the crash (including time zone), the identity of the vehicle (e.g., VIN, make/model, license plate number, etc.), the identity of the driver involved in the crash (e.g., name, customer number, driver's license number, etc.), and the identity of the mobile device 216 (e.g., IMEI, MAC address, IP address, etc.). For example, the time may be represented by a timestamp in the following format: YYYY-MM-DD HH:MM:SS -ZZZZ. -ZZZZ may stand for time zone offset from UTC (e.g., -0500 is Eastern Standard Time). In some aspects, the mobile device 216 may send the data to the crash detection server 250, which may store the data in database 252. The mobile device 216 may also send data for a number of seconds before and after the time window (e.g., 5 seconds before and 5 seconds after or 10 seconds before and 10 seconds after) to the crash detection server 250, and the data may be stored in database 252. By providing this data to the crash detection server 250, the server may be able to compare the before, during, and after values to confirm the crash. The crash detection server 250 may also use the stored information to make fast insurance claim determinations (relative to if the driver reports the crash days or weeks later), begin estimating vehicle damage costs faster at the First Notice of Loss (FNOL), and identify the location of accidents.

In step 460, the computing device may notify one or more individuals of the crash, via email, a telephone call, an on-screen pop-up, or any other communication medium. For example, the computing device may contact emergency personnel, such as local fire or police personnel. The message to the emergency personnel may include the location of the crash, the identity of the driver involved in the crash, the license plate number of the vehicle, the severity of the crash, and the like. The computing device may similarly send messages to other individuals, such as the driver's emergency contact identified in his or her profile stored in database 252. The computing device may also attempt to contact the driver or passenger of the vehicle involved in the crash. For example, the computing device may attempt to call the mobile device 216 or an onboard vehicle communication system in the vehicle 210. Additionally or alternatively, the computing device may provide emergency personnel with the phone number of the mobile device 216, which they may use to contact individuals in the vehicle.

Returning to step 420, the computing device may determine that the time window ended (step 420: Y), without the acceleration count exceeding the threshold number of acceleration events needed to determine that a crash occurred. In response, the computing device may determine that a non-crash event occurred, such as the mobile device 216 being dropped or a hard braking event. For example, if the mobile device 216 is dropped, the computing device might only detect one or two high magnitude events (compared to three or four for a crash). Accordingly, in step 440, the computing device may determine whether the number of high magnitude acceleration events falls below a mobile device drop threshold, such as two or three. If so (step 440: Y), the computing device may determine, in step 470, that the mobile device was dropped. The computing device may optionally return to step 405 to detect for additional trigger events and/or crashes. Otherwise, in step 475, the computing device may determine that a hard braking event occurred. The computing device may return to step 405 to detect for additional trigger events and/or crashes.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:
1. A mobile computing device comprising:
an accelerometer configured to measure acceleration of at least one axis of the accelerometer;
communication circuitry configured to wirelessly communicate with other devices;
a processor; and
memory storing computer-executable instructions that, when executed by the processor, cause the processor of the mobile computing device to:
determine whether a trigger event has occurred;
after determining that the trigger event has occurred, initiate a time window for measuring acceleration using the accelerometer, wherein the time window comprises a time duration;
during the time duration, receive, from the accelerometer, a plurality of acceleration measurements measured by the accelerometer;

after the time duration, determine, based on the plurality of acceleration measurements measured by the accelerometer and received during the time duration, a number of acceleration events occurring during the time window;

when the number of acceleration events occurring during the time window does not exceed a threshold number of acceleration events, determine that a vehicle associated with the mobile computing device was not involved in a crash and determine that the mobile computing device was dropped or the vehicle was involved in a braking event; and transmit, via the communication circuitry and to a server, data corresponding to the number of acceleration events occurring during the time window and indicating that the vehicle was not involved in a crash.

2. The mobile computing device of claim 1, wherein determining that the mobile computing device was dropped or the vehicle was involved in a braking event comprises:

determining, based on a determination that the number of acceleration events occurring during the time window does not exceed a second threshold number of acceleration events, that the mobile computing device was dropped, wherein the second threshold number of acceleration events is less than the threshold number of acceleration events.

3. The mobile computing device of claim 1, wherein determining that the mobile computing device was dropped or the vehicle was involved in a braking event comprises:

determining, based on a determination that the number of acceleration events occurring during the time window exceeds a second threshold number of acceleration events, that the vehicle was involved in a braking event, wherein the second threshold number of acceleration events is less than the threshold number of acceleration events.

4. The mobile computing device of claim 1, wherein the memory stores computer-executable instructions that, when executed by the processor, cause the processor of the mobile computing device to:

receive, from the accelerometer, an acceleration measurement measured by the accelerometer; and determine a magnitude of the acceleration measurement measured by the accelerometer, wherein determining that the trigger event has occurred comprises determining that the magnitude of the acceleration measurement measured by the accelerometer exceeds an acceleration magnitude threshold.

5. The mobile computing device of claim 1, wherein the memory stores computer-executable instructions that, when executed by the processor, cause the processor of the mobile computing device to:

determine whether a change in speed of the vehicle exceeds a threshold change in speed, wherein determining that the trigger event has occurred comprises determining that the change in speed of the vehicle exceeds the threshold change in speed.

6. The mobile computing device of claim 5, further comprising a global positioning satellite (GPS) sensor, wherein determining whether the change in speed of the vehicle exceeds the threshold change in speed is based on a change in speed measured by the GPS sensor of the mobile computing device.

7. The mobile computing device of claim 1, wherein the memory stores computer-executable instructions that, when executed by the processor, cause the processor of the mobile computing device to:

periodically measure, via the accelerometer and within the time window for measuring acceleration using the accelerometer, acceleration, wherein receiving the plurality of acceleration measurements measured by the accelerometer comprises receiving the periodically measured acceleration measured via the accelerometer.

8. The mobile computing device of claim 1, wherein a magnitude of each of the acceleration events occurring during the time window exceeds an acceleration magnitude threshold.

9. The mobile computing device of claim 1, wherein the mobile computing device comprises a mobile phone.

10. A method comprising:

determining, by a processor of a mobile computing device, whether a trigger event has occurred;

after determining that the trigger event has occurred, initiating, by the processor of the mobile computing device, a time window for measuring acceleration using an accelerometer, wherein the time window comprises a time duration;

during the time duration, receiving, by the processor of the mobile computing device and from the accelerometer, a plurality of acceleration measurements measured by the accelerometer;

after the time duration, determining, by the processor of the mobile computing device and based on the plurality of acceleration measurements measured by the accelerometer and received during the time duration, a number of acceleration events occurring during the time window;

when the number of acceleration events occurring during the time window does not exceed a threshold number of acceleration events, determining, by the processor of the mobile computing device, that a vehicle associated with the mobile computing device was not involved in a crash and determining that the mobile computing device was dropped or the vehicle was involved in a braking event; and transmitting, by the mobile computing device, via communication circuitry associated with the mobile computing device, and to a server, data corresponding to the number of acceleration events occurring during the time window and indicating that the vehicle was not involved in a crash.

11. The method of claim 10, wherein determining that the mobile computing device was dropped or the vehicle was involved in a braking event comprises:

determining, based on a determination that the number of acceleration events occurring during the time window does not exceed a second threshold number of acceleration events, that the mobile computing device was dropped, wherein the second threshold number of acceleration events is less than the threshold number of acceleration events.

12. The method of claim 10, wherein determining that the mobile computing device was dropped or the vehicle was involved in a braking event comprises:

determining, based on a determination that the number of acceleration events occurring during the time window exceeds a second threshold number of acceleration events, that the vehicle was involved in a braking event, wherein the second threshold number of acceleration events is less than the threshold number of acceleration events.

13. The method of claim 10, further comprising:
receiving, from the accelerometer, an acceleration measurement measured by the accelerometer; and
determining a magnitude of the acceleration measurement measured by the accelerometer, wherein determining that the trigger event has occurred comprises determining that the magnitude of the acceleration measurement measured by the accelerometer exceeds an acceleration magnitude threshold.

14. The method of claim 10, further comprising:
determining whether a change in speed of the vehicle exceeds a threshold change in speed, wherein determining that the trigger event has occurred comprises determining that the change in speed of the vehicle exceeds the threshold change in speed.

15. The method of claim 14, wherein determining whether the change in speed of the vehicle exceeds the threshold change in speed is based on a change in speed measured by a global positioning satellite (GPS) sensor of the mobile computing device.

16. The method of claim 10, further comprising:
periodically measuring, via the accelerometer and within the time window for measuring acceleration using the accelerometer, acceleration, wherein receiving the plurality of acceleration measurements measured by the accelerometer comprises receiving the periodically measured acceleration measured via the accelerometer.

17. The method of claim 10, wherein a magnitude of each of the acceleration events occurring during the time window exceeds an acceleration magnitude threshold.

18. The method of claim 10, wherein the mobile computing device comprises a mobile phone.

19. A non-transitory computer readable medium storing instructions that, when read by a processor of a mobile computing device, cause the processor of the mobile computing device to:

determine whether a trigger event has occurred;
after determining that the trigger event has occurred, initiate a time window for measuring acceleration using an accelerometer, wherein the time window comprises a time duration;
during the time duration, receive, from the accelerometer, a plurality of acceleration measurements measured by the accelerometer;
after the time duration, determine, based on the plurality of acceleration measurements measured by the accelerometer and received during the time duration, a number of acceleration events occurring during the time window;
when the number of acceleration events occurring during the time window does not exceed a threshold number of acceleration events, determine that a vehicle associated with the mobile computing device was not involved in a crash and determine that the mobile computing device was dropped or the vehicle was involved in a braking event; and
transmit, via communication circuitry associated with the mobile computing device and to a server, data corresponding to the number of acceleration events occurring during the time window and indicating that the vehicle was not involved in a crash.

20. The non-transitory computer readable medium of claim 19, wherein determining that the mobile computing device was dropped or the vehicle was involved in a braking event comprises:
determining, based on a determination that the number of acceleration events occurring during the time window does not exceed a second threshold number of acceleration events, that the mobile computing device was dropped, wherein the second threshold number of acceleration events is less than the threshold number of acceleration events.

* * * * *